United States Patent
Toupal et al.

(10) Patent No.: US 6,976,031 B1
(45) Date of Patent: Dec. 13, 2005

(54) SYSTEM AND METHOD FOR AUTOMATICALLY GENERATING A NARRATIVE REPORT OF AN EVENT, SUCH AS A SPORTING EVENT

(75) Inventors: Ron Toupal, Plano, TX (US); David Schmid, Plano, TX (US)

(73) Assignee: SportsPilot, Inc., Frisco, TX (US)

( * ) Notice: Subject to any disclaimer, the term of this patent is extended or adjusted under 35 U.S.C. 154(b) by 0 days.

(21) Appl. No.: 09/511,476

(22) Filed: Feb. 23, 2000

Related U.S. Application Data (63) Continuation-in-part of application No. 09/455,551, filed on Dec. 6, 1999.

(51) Int. Cl.$^7$ .............................. G06F 7/00; G06F 15/00
(52) U.S. Cl. ...................... 707/104.1; 707/9; 715/500.1
(58) Field of Search .......................... 707/1–9, 100–104, 707/500.1, 530, 521; 705/1, 10–12; 715/500.1; 463/4, 5, 7

(56) References Cited

U.S. PATENT DOCUMENTS

| | | | | |
|---|---|---|---|---|
| 6,144,375 A | * | 11/2000 | Jain et al. ................ | 707/500.1 |
| 6,240,415 B1 | * | 5/2001 | Blumberg .................... | 707/9 |
| 6,260,019 B1 | * | 7/2001 | Courts ......................... | 705/1 |

* cited by examiner

Primary Examiner—Uyen Le
Assistant Examiner—Te Tu Chen
(74) Attorney, Agent, or Firm—Slater & Matsil, L.L.P.

(57) ABSTRACT

An automatic report generator provides a narrative account of a newsworthy happening such as an sporting event by using templates. The game events are retrieved from storage and various statistics are generated from the game log and from past game logs. A template is selected for report generation in a two step process. First, conditional criteria associated with a template are compared to the game statistics to determine whether the template matches the game. In a second step, the remaining candidate templates are subjected to a weighting analysis by which the template providing the most detailed description, or describing the most relevant events of the game is selected. Once selected, game specific information is inserted into the template through the use of functions calls that request game specific data from the game log or from the game statistics generator.

12 Claims, 6 Drawing Sheets

SYSTEM AND METHOD FOR AUTOMATICALLY GENERATING A NARRATIVE REPORT OF AN EVENT, SUCH AS A SPORTING EVENT

This application is a continuation-in-part of U.S. patent application Ser. No. 09/455,551 filed on Dec. 6, 1999, which application is incorporated herein by reference.

FIELD OF THE INVENTION

This invention relates generally to automated processes for gathering and organizing data and generating a narrative report from the data and more specifically to automated processes for generating a narrative report of an event, such as a sporting event, which report is formatted based upon the best fit between an analysis of the event data and a series of pre-defined report templates.

BACKGROUND OF THE INVENTION

There is a great desire for sports news and information among teams, players, and fans at all competitive levels including professional, semi-professional, collegiate, high school, and amateur. The size of the audience decreases exponentially, however, as the level of competition decreases. For instance, any given professional team may have an audience of several million (via game attendance, television and radio broadcasts, and print reporting of the events), whereas at the other end of the spectrum, a typical neighborhood amateur team may have an audience of perhaps ten to forty people.

Because of the large potential audience for professional sports events, a relatively large amount of money is available for collecting and reporting on the event. Entire industries have grown around television reporting and print reporting of professional sports teams, and upon gathering, organizing and disseminating events data and statistics regarding the various leagues, teams, and players. Because of the large audience base, collecting and disseminating professional sports events data is a lucrative industry, when the costs of gathering and reporting the event data is spread across the audience base.

By contrast, with an audience base in the tens or perhaps at most the hundreds, the cost of collecting, analyzing and reporting on a typical amateur sports team event would be prohibitive. Few amateur sports teams fans would be willing to spend hundreds or perhaps thousands of dollars to support a system for collecting and reporting the data.

Some amateur sports organizations have attempted to rely upon a volunteer workforce to minimize the cost of collecting and reporting sports event data. Oftentimes one or more parents of an amateur sports participant, or some other interested volunteer, will offer his or her services in going to the sports event and recording the important events, such as goals or runs scored, final score and the like, and in preparing a periodical newsletter with relevant team or league information. Such a system, while relatively inexpensive, seldom provides satisfactory results. The reliability of the volunteer workforce is uncertain, inconsistent or incorrect scores and event data may be reported, and the time required for a volunteer to analyze, prepare and disseminate the data is oftentimes too onerous to justify the results. Also, the costs associated with printing and distributing the newsletter, and the time involved, means that the reporting of amateur events is often infrequent and not timely.

The advent of the Internet has provided an avenue whereby a limited audience can receive timely access to information at a relatively reduced cost. One example of a volunteer-based amateur event reporting system is provided for at www.instasports.com. This system provides a web site on which interested fans can access information regarding their local high school amateur athletic teams. The information available, however, is limited to the information that a volunteer workforce (i.e. parents or other interested persons) are able to provide by manually recording important data about the sports events, and then manually providing that information to the web site manager. A review of the referenced web site reveals that a significant amount of the league, team, and player information that is contemplated as being available on the web site is simply unavailable because the information has not been provided to the web site manager, or else has not been placed on the web site by the manager.

Another shortcoming to the instasports.com web site is that, whereas some statistical data regarding a selected game may or may not be available, nowhere does the site provide a clear written or spoken narrative of the game. For that type of information, an interested audience member must still rely upon traditional media such as local television news reporting or local print media. Obviously, however, only a very small fraction of amateur sports events are covered by traditional media, especially in more populated metropolitan areas where television air time and print space is at a premium.

Therefore, a need exists in the art for a system whereby information relating to an amateur sports event (or a similar event in which a relatively small audience has an interest in the statistical analysis of the event or about highlights of the event) can be collected, analyzed, and reported back to the audience in an automated, timely manner, and at a relatively low cost (on a per capita basis). The need also exists for such a system that can provide not only statistical reporting, but that can also provide for a narrative account of the sports event written in a manner that is both informative and entertaining, such as is commonly available for professional sports events (via television and print media) with larger audiences.

The present invention meets the existing needs in the art, as will be explained in detail in the following detailed description of certain preferred embodiments of the invention.

SUMMARY OF THE INVENTION

In one aspect, the present invention provides an automated system for generating an article describing an event. The system includes a log comprised of recorded events, means for generating statistics from the game log, and a plurality of article templates, each template having associated with it at least one condition. The system further includes means for comparing the at least one condition to the statistics and for identifying as candidate templates those templates for which the at least one condition is met by the statistics, means for selecting one template from amongst the candidate templates, and means for generating a finished article from the selected template and the recorded events.

In another aspect, the invention provides a method of automatically generating a descriptive report of a happening. The method includes the steps of recording events in a pre-defined format in a game log, generating game statistics from the events, comparing the game statistics to a plurality of conditions associated with a plurality of templates and selecting at least one template having conditions that are met by the game statistics. In the event more than one template has conditions that are met by the game statistics, the method further includes the steps of selecting from amongst the more than one templates, a selected template having conditions that are most desirable according to predetermined criteria, inserting game statistics and game events into the selected template to generate the descriptive report, and publishing the descriptive report.

BRIEF DESCRIPTION OF THE DRAWINGS

The above features of the present invention will be more clearly understood from consideration of the following descriptions in connection with accompanying drawings in which.

DETAILED DESCRIPTION OF PREFERRED EMBODIMENTS

The making and use of the various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

Description of Integrated System

Figure 1:
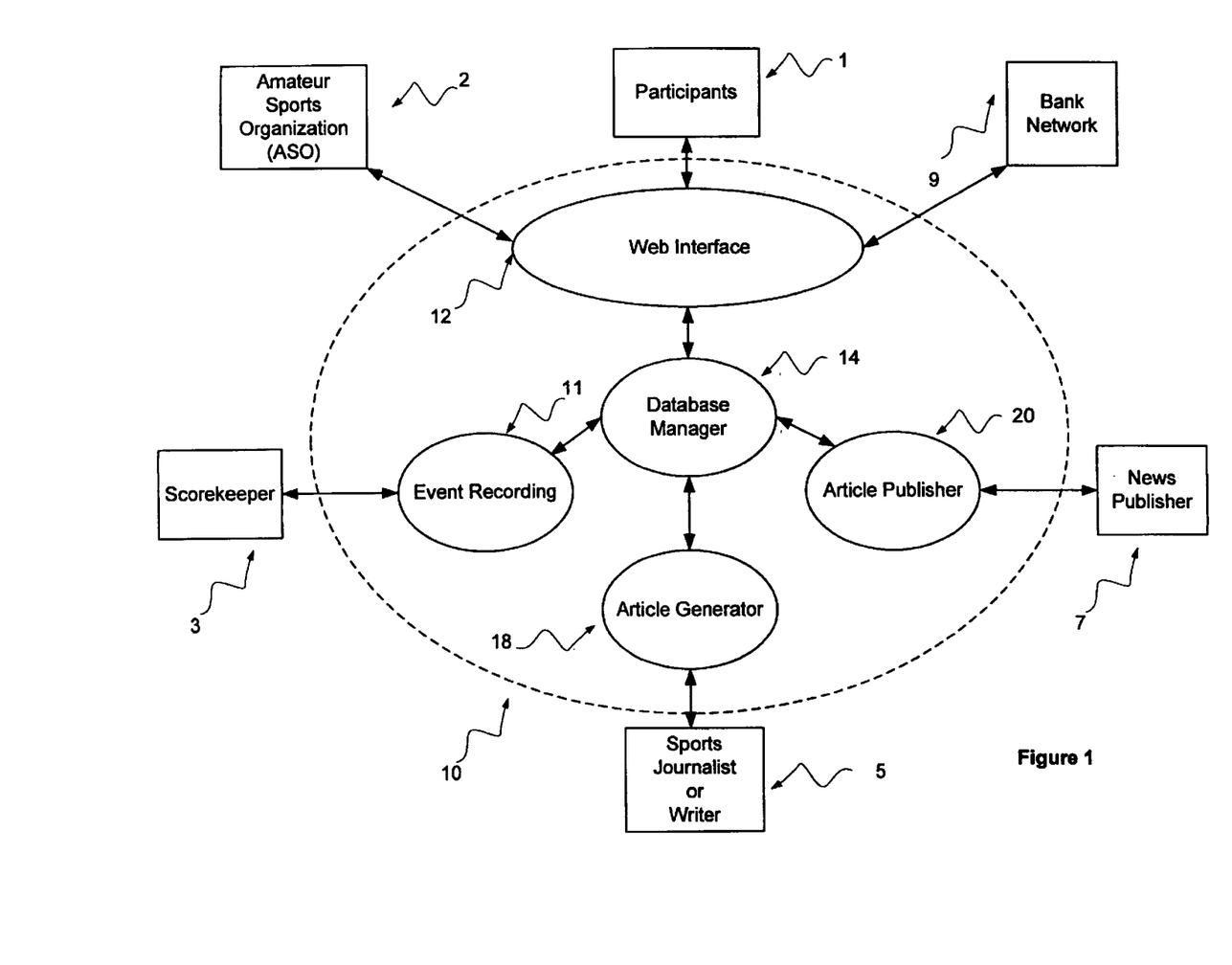
FIG. 1 is an overview block diagram of an integrated system for collecting, creating, and publishing sports events reports including a preferred embodiment report generator.

Referring now to FIG. 1, an integrated system employing a preferred embodiment of the present invention is described in block diagram format. Integrated sporting event information system is illustrated as indicated generally as 10. The integrated sporting event information system includes a web interface component 12, a database manager component 14, an event recording component 11, an article generation component 18, and an article publication component 20. For clarity, throughout the description of the preferred embodiments, the event (such as a football) game to be reported upon will be referred to as a sporting event, and the individual events comprising the game (such as touchdowns, penalties, time-outs, and the like) will be referred to as game events. A more generic description would be to refer to the sports event generically as a "happening" (as the present invention applies more broadly than as to sporting events), and each specific instance of note comprising the happening could be generically referred to as simply an event.

The integrated sporting event information system 10 is intended to interface with various different entities wherein information is entered into and obtained from the integrated system 10. For instance, a scorekeeper 3 records information about specific game events and enters that information into the integrated system 10 via the event recording component 11, as is discussed in greater detail in co-pending patent application Ser. No. 09/455,551.

Web interface 12 provides an interface wherein an Amateur Sports Organization (ASO) 2, and participant(s) 1, can enter information into the integrated system 10. For instance the ASO 2 preferably enters information such as league rules, team rosters, and schedules into integrated system 10. This information can then be maintained and disseminated to e.g., participants 1, such as players seeking information on their team schedule. Likewise, participants 1 will use web interface 12 to enter their own relevant information such as registration information, which can then be accessed and used by ASO 2 in forming the leagues and teams.

Also illustrated in FIG. 1 is the interchange of information between integrated system 10 and news publisher 7 and sports journalist 5. As will become clear in the following detailed description, the integrated system 10 provides for an efficient and inexpensive solution to providing timely and complete information regarding sporting events to any interested audience. Further details regarding report generator are provided in the following paragraphs.

Automatic Article Generator

Report generator 18 preferably generates entertaining and informative narratives of games played. While the preferred embodiment is described in the context of amateur sports events reporting, it should be apparent that the teachings provided herein apply in other contexts in which it is desired to generate narrative reports, summaries, articles, and the like from a collection of fairly uniform instances of events.

Figure 2:
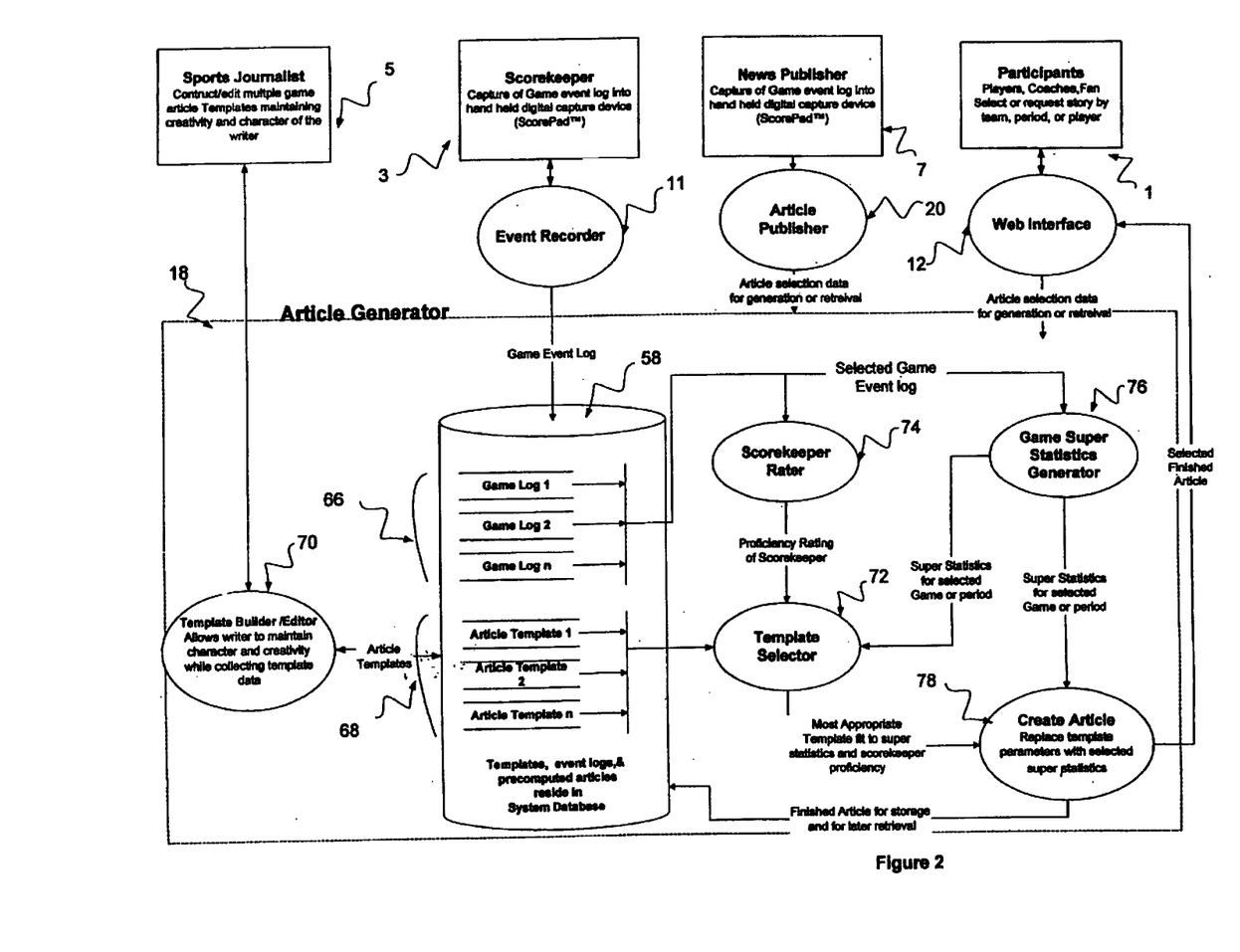
FIG. 2 is a block diagram of a preferred embodiment report generator.
Figure 3A:
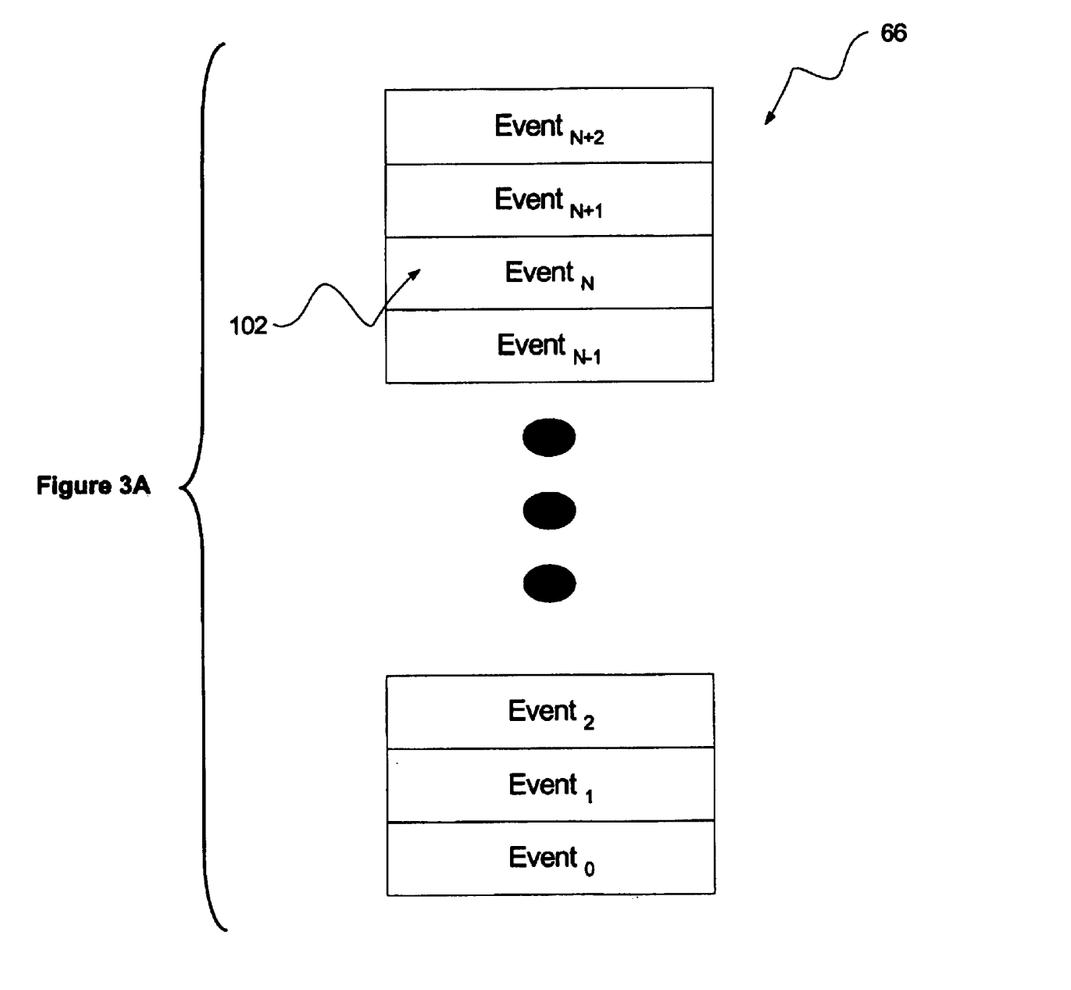
FIG. 3a illustrates the format of a preferred embodiment game event log.
Figure 3B:
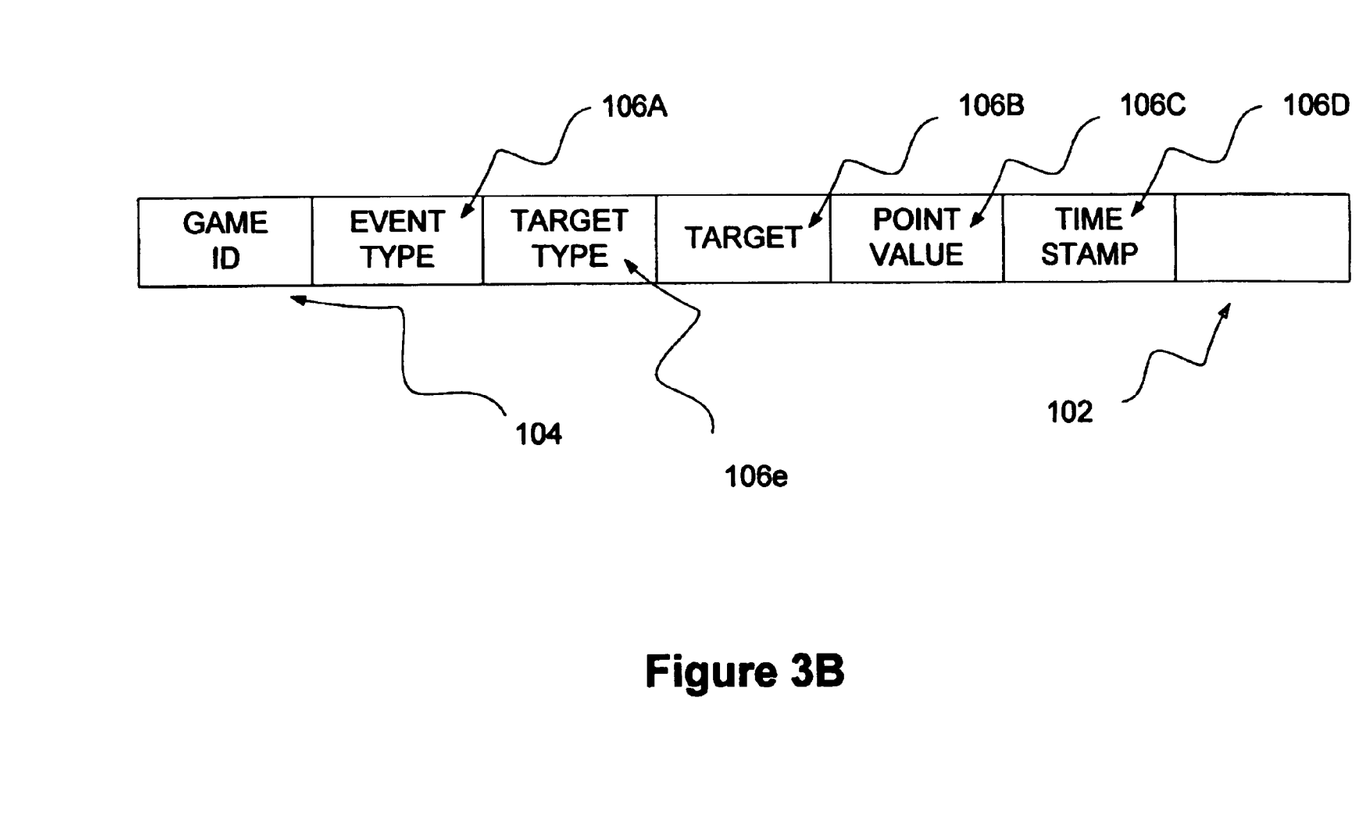
FIG. 3b illustrates the format of a preferred embodiment game event.

The information regarding key game events is recorded by a scorekeeper 3 using an event recorder 16 which delivers that game event information to the database manager 14 where it is stored in database 58, as discussed in detail below. Report generator 18 takes the stored game event information and automatically generates reports and articles for use by ASO 2, by participant(s) 1, including players, coaches, and fans, and by local media such as newspapers, radio stations, and television stations 7. As illustrated in FIG. 2, game event information provided by event recorder 11 is stored in database 58 in the form of game logs 66, as indicated by "game log 1," "game log 2," "game log n." FIG. 3a provides additional details of a game log 66. Each game log 66 is comprised of a listing of game events 102 (each such game event corresponding to a game event as recorded in event recorder 16 by scorekeeper 3). As illustrated in FIG. 3b, each game event 102 comprises a game identifier field 104, indicating for which game the event was recorded, and one or more fields 106a, 106b, etc., providing information regarding the event. The game identifier 104 is a unique identification code given to each game for which a game log 66 is stored in database 58.

Fields, 106a, 106b, etc. provide information about the individual game event 102 that will be used in generating the game report. In the preferred embodiment, each game event has four fields associated with it in addition to the game identifier 104. The first field describes the type of event. As an example, for "event type" field 106a, an event may be of the type scoring event. The information contained within field 106a of game event 102 will indicate that the particular game event recorded by the scorekeeper was a scoring event (such as a home run in baseball, a touchdown in football, a goal in soccer, or some similar scoring event). Other "event types" could include fouls, penalties, assists, substitutions, and the like.

Field 106e is the "target type," which field generically describes the logical entity for which the event is recorded, such as player, team, or game. Note that field 106e does not contain specific player or team names, or game dates, but rather, simply indicates the type of logical entity involved (e.g. "player," or "team," or "game").

Field 106*b*, which is the "target" field, indicates the specific player, team, or game, for which the particular game event 102 is relevant. Fields 106*b* and 106*e* together describe the relevant logical entity. For instance, for a scoring event (in field 106*a*), the target type field 106*e* would indicate that the event applies to a "player," and the target field 106*b* would contain the identity code corresponding to the specific player who scored. For a time-out event in field 106*a*, field 106*e* would indicate "team" as the relevant entity to which the event applied and target field 106*b* would contain the identification code for the specific team that called the time-out. The relevant entity might in fact refer to the entire game, such as an overtime event, a rained-out event, or the like, in which case field 106*e* would contain "game" and field 106*b* would contain the identification code for that game. Note that in that case field 106*b* and field 104 would contain redundant data (i.e. the game identification code).

Another field contained within game event 102 is the point value field 106*c*. This field contains a numerical value corresponding to the game event. For non-scoring game events (e.g. time-outs, penalties, and the like), this field will be set to a default value of one for computational simplicity and convenience. As an example, if it is desired to determine how many time-outs were called during a game, the game log can be searched for event type "time-out" (field 106*a*) and the point values (field 106*c*) associated with each time-out added up. Because the point value is one, the sum of the fields 106*c* will equal the total number of time-outs in the game.

Yet another field of game event 102 is time stamp 106*d*. This fields contains information relating to the time, relative to the start of the game, that the particular event occurred. While the preferred embodiment fields are described above for illustration, it will be clear that other fields are contemplated within the scope of the invention. Additional examples might include an event sub-type field which would allow for distinguishing different categories of events (e.g. a one minute time-out and a twenty second time-out), or a target-pair field that would be applicable when an event involves two players (e.g. a penalty that is committed by one player against another player). Another example would be the incorporation of a second scorekeeper identification field, linked to the first game identification field 104. This would be useful, for instance, when two scorekeepers 3 (FIG. 1) record information about the same game, and it is desirable to link the two game logs 66 generated by the two scorekeepers. Other fields will become apparent through routine experimentation. The game events 102 comprising the game log 66 provide the information from which a complete and descriptive report or article can be generated. In many instances, the article will be even further enhanced by incorporating historical context information (league standings, wins-losses record, and the like). Such historical context can be provided by generating statistics from past game logs. Preferably, historical context can be quickly derived from stored game summaries which store a few particularly relevant data points about past games, as will be described more fully below. The article is generated by selecting one article template from a series of templates and inserting game-specific information, generated from the game log, into that template. Further description of the article templates 68 will be provided in the following paragraphs.

Figure 4:
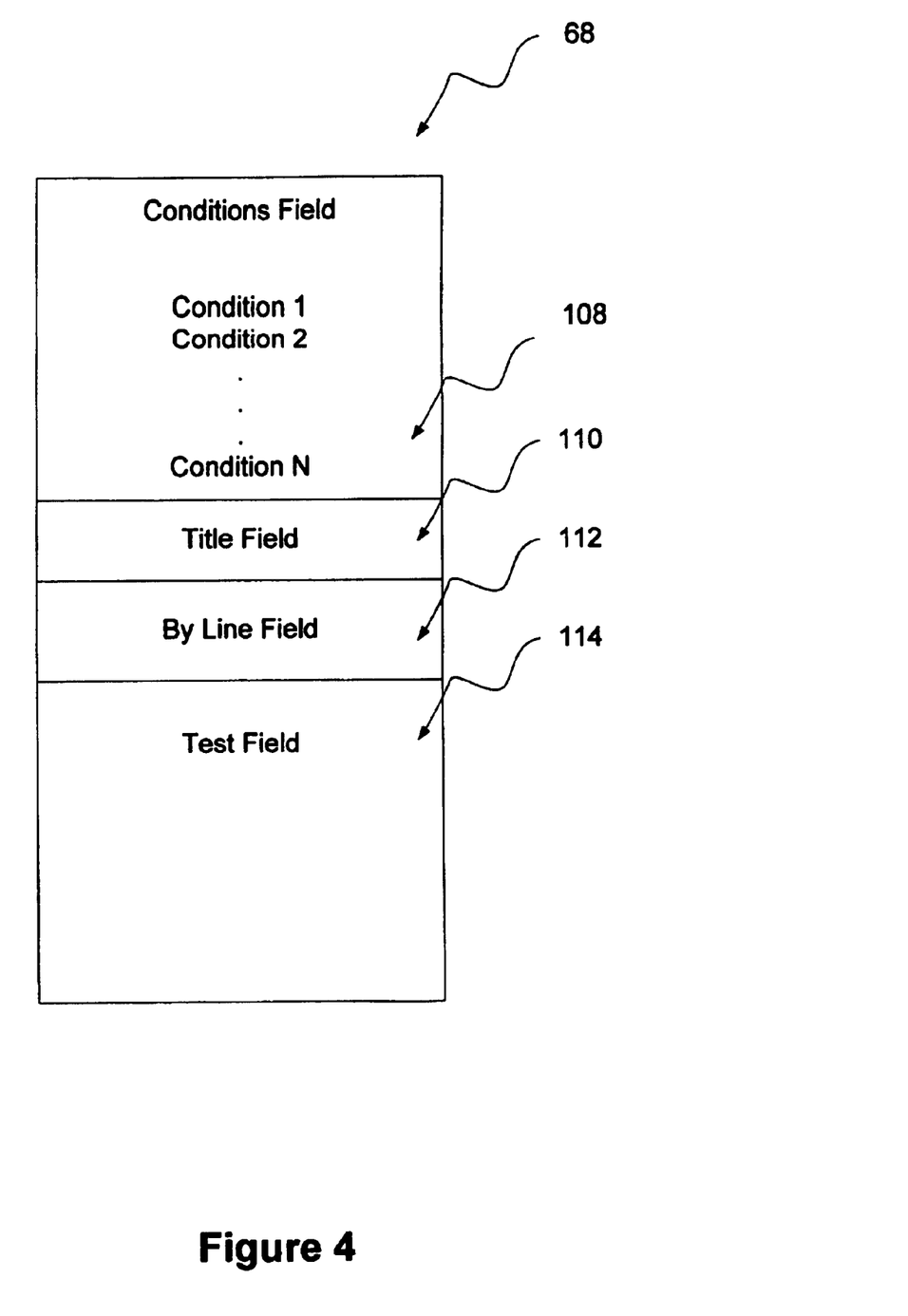
FIG. 4 illustrates an exemplary template used for article generation in a preferred embodiment.

FIG. 4 illustrates an exemplary article template 68. A template is a pre-written description of a game. Perhaps more accurately, a template is a pre-written description of a model game with fields in which references to an actual game can be input. For instance, a very simple template might state simply that "[WinningTeam] beat [LosingTeam] last [GameDay], with a final score of [WinningScore] to [LosingScore]." Obviously, this very simplistic template is provided solely for explanation and an actual template will provide much more detailed information and will present the information in an informative and entertaining manner. The simple example provided, however, illustrates how the template is essentially generic, but provides fields wherein game-specific information (such as the names of the teams, and the final scores) can be inserted in order to generate an article that describes the actual game. Information for the fields is generated by the use of tokens, as will be discussed in greater detail below.

As shown in FIG. 2, several different templates 68 are available. Each template describes a different "type" of model game (e.g. a tie game, a "blow-out," a "slugfest,"an overtime game, etc.) which can be modified to describe a specific game. Template selector 72 must be able to quickly select one template 68 that accurately describes the game for which a report is desired. Obviously, the templates are sport specific, i.e. a template written to describe a baseball game would be a poor fit for a football game. So, each template will have associated with it the type of game to which it applies, and template selector will only review those templates that match the type of game under consideration.

With reference to FIG. 4, exemplary template 68 is logically divided into a series of fields. Conditions field 108 contains several conditions which must be met in order for the template to be eligible for report generation. Further details of the conditions and selection process will be provided below. Title field 110 is a text field in which the title or headline for the article is provided, and by-line field 112 is a text field in which the name of the author of the template is provided. Text field 114 contains the text of the article to be generated from template 68. This text field will contain token identifiers throughout the text, indicating those locations for which actual game-specific information (team names, player names, scores, and the like) is to be substituted.

In the following paragraphs, the process of generating a game article will be described with reference to FIG. 5. The process is initiated when an end-user requests a game article, as indicated by flowchart step 120. The end-user could be a participant 1, such as a player, coach or fan, requesting an article via web interface 12, as illustrated in FIG. 2. Alternatively, the end-user might be a news publisher, such as a local newspaper requesting an article via article publisher interface 20. The end-user must specify the game for which an article is sought. This can be accomplished in various ways. The simplest method for specifying a particular game is for the end-user to provide certain identifying information about the game, such as the game date and competing teams. This information can be requested and the responses formatted in any convenient manner by appropriately designed web interface 12 or article publisher interface 20. Alternatively, the user could be presented with a search feature by which to identify a desired game. For instance if the end-user does not know the game date or team name, but simply desires a report on the most recent game in which a particular player participated, web interface 12 can provide a search facility in which the end-user inputs the player's name. Game logs 66 can then be quickly searched using well-known database search techniques in order to identify all games, or the most recent games, in which the player participated, and those games can be listed out for the end-user to select a specific desired game. Other methods for game selection will be apparent to one skilled in the art. For instance, web interface 12 may be configured to provide a list of most recently played games from which to select the desired game, or may provide a series of lists, logically organized by league, team, division, and the like. In another preferred embodiment, web interface 12 (FIG. 1) is configured to resemble a traditional print media home town sports page. Based upon the end-user's preference, the Web page will come up with one or more articles specific to the end-user's interests. In this way, once the end-user's interests are known (either from historical viewing patterns, through the end-user's id code, or through some form of input screen), Web interface 12 will automatically request that reports specific to the end-user's interests (e.g. "home" team, favorite players, and the like). Also included on the Web page could be automatically generated information about upcoming games, schedules, league standings, and the like, relevant to the end-user's interests.

Referring again to FIG. 5, once the end-user has identified a particular game in step 120, the game log 66 associated with the desired game is retrieved from database 58, as indicated by step 122. Using the information contained within game events 102, statistics generator 76 will generate a series of generic or default game statistics, per step 124. These generic game statistics are a sub-set of the entire set of game statistics that can be generated by statistic generator 76 and comprise common types of statistics that would apply to most games. Examples of generic game statistics include final score, final score differential, points per game, penalties per game, and the like. Preferably, the generic game statistics that are generated are dependent upon the type of game (soccer, hockey, etc.) under consideration. The advantageous feature of the generic game statistics are that they can be generated quickly and without consuming excessive processing bandwidth. Preferably, the generic game statistics can be generated from the game log itself, without the need to reference historical game summaries.

A brief explanation of the use of tokens will now be provided prior to the following detailed description of the template selection process. A token is essentially a function call from which desired information can be derived. The token can also be thought of as a variable. For instance, the conditions described above can be expressed as tokens. Likewise, as will be described in more detail below, the variables contained within the text body of the template can also be expressed as tokens. An exemplary game condition might be that the winning team outscored the losing team by a landslide, such as a ten point difference in a baseball game. This condition can be expressed logically as "The winning team score minus the losing team score is equal to or greater than ten points". The condition can be expressed more succinctly using tokens, to wit:

[SwTeamPoints(WinTeam)]−[SwTeamPoints(LoseTeam)]>=10

Two tokens are used to express the condition. The first token, using a convention that tokens are identified with a prefix of "Sw" is SwTeamPoints, along with the argument (WinTeam). This token is a function call to statistics generator 76, which will return the final score for the winning team. Likewise, token SwTeamPoints, along with the argument (LoseTeam) will generate a function call to statistics generator 76, which will return the final score for the losing team. A simple calculation is then made to determine if the difference between the two final scores is equal to or greater than 10. As will be shown below, tokens are also employed in the templates themselves as variable fields into which are inserted the appropriate value, text string (such as a team name) or function call result.

Alternatively, the above condition could be expressed using a single token, along the lines of:

[SwScoreDiff]>=10

This single token would cause a function call from which statistics generator 76 will return the difference between the winning team's and the losing team's final scores.

After the generic game statistics are generated in step 124, the first article template 68 is retrieved from database 58, as indicated by process step 126. Each template has associated with it one or more conditions, which are criteria that must be met by the game statistics in order for there to be a "match" between the game under consideration and the template. In step 128, these conditions are compared to the generic game statistics that were generated in step 124 to determine if the conditions are met by the game statistics, as will be described in more detail below. For each condition, the comparison will result in either a "yes" indication that the condition is met, a "no" indication that the condition is not met, or a "TBD" indication that additional information about the game is required to determine whether the condition is met.

In decision step 130, it is determined whether any of the template's conditions are not met by the game statistics, i.e. whether step 128 resulted in a "no" indication for any of the template's conditions. If so, then the template is disregarded as not being a good fit for the game under consideration, as shown in step 132. If the comparison step 128 resulted in all conditions being "yes" or being "TBD," then the template is considered a candidate template and will be flagged as a candidate template, per step 133. This candidate template may or may not be selected for the article, depending upon whether some other template provides a better description of the game, as described in the following process steps. In step 134, it is determined whether database 58 contains additional templates for consideration. If so, processing returns to step 126 where the next template is loaded. If not, processing continues as will be discussed below. Recognize that process steps 124 through 134 allow for a quick first pass culling of all available templates. Many (in some instances most) of the available templates can be quickly eliminated by comparing their conditions to the quickly generated default statistics. For a system in which tens, scores, or perhaps hundreds of templates are contemplated, this quick first pass culling allows system 10 to quickly provide an end-user with an article without a substantial delay that could tend to lessen the desirability of the system, from the end-user's perspective.

Once all of the templates have been compared in this first pass (steps 124 through 134), processing proceeds to step 136, where the remaining templates that were not eliminated are re-evaluated in a second pass. Once again, each template is considered in turn. In step 138, it is determined whether the comparison step 128 resulted in any of the conditions being flagged as TBD (recall this means that statistics generator 76 had not generated sufficient information to determine whether the condition was met). If any of the conditions for the template are TBD, processing continues to step 140 where the tokens associated with the TBD conditions are passed to statistics generator 76 in order to generate the information necessary to evaluate the condition. Once the additional statistics are generated, a comparison with the TBD conditions are made, step 142, and the template once again evaluated to determine if any of the conditions are not met, step 144. At this point, all the conditions should have either a "yes" or a "no" indication, all the TBD indications having been resolved in steps 140 and 142. If the template has any "no" indications (meaning the template does not accurately match the game information), this template is disregarded as indicated in step 146, and processing proceeds to step 148. If, in decision step 138, none of the conditions are "no," indicating that the template accurately describes game, the template is maintained as a candidate, and processing proceeds to step 148. In step 148, it is determined whether there are other candidate templates for evaluation. If so, each one is loaded and evaluated in turn, in steps 136 through 148.

Note that additional statistics, beyond the generic game statistics generated in step 124, are required for the second pass comparison. Some of these statistics require historical context in order to evaluate them. An example might be a template that describes a game in which the playing teams were in first and second place in their league. Obviously, that information can not be garnered from the game events log itself. The historical standing of both teams for the season is necessary in order to determine whether the game involved the first and second place teams. This information could be gathered by searching database 58 for all game logs 66 in which a team had played, adding the total points scored by the team per game, adding the points scored by the opponents in each game, determining the winner for each game, determining the total number of games the team had won, and then comparing the total wins to the total wins for every other team in that league. Then, the process would be repeated for the other team that had played in the game under consideration. Clearly, this process would be very time and processing intensive.

Game summaries greatly simplify generation of statistics that require historical context. Game summaries can be thought of as a special class of game log, in which only key information is stored, such as the identify of the teams that played, the identity of the winning team, and the winning team and losing team final scores. These game summaries can be quickly scanned to determine historical context such as league standings, league records, and the like. In other preferred embodiments, historical context can also be provided via team summaries (i.e. a special class of game log that provides the number of team wins, final scores, and the like), and via player summaries (i.e. a special class of game log that provides historical data such as number of points scored, number of games played, assists, penalties, and the like for individual players). As will be apparent to one skilled in the art, the use of historical context summaries allows for quicker processing of a greater variety of conditions, thus allowing for more detailed and fully descriptive templates to be quickly evaluated for selection.

Once all the candidate templates have been evaluated in the second pass, a short list of templates remains. Any one of these templates could accurately describe the game because all of its associated conditions are satisfied by the game statistics and information. In step 150 of FIG. 5, one of the remaining templates is selected based upon a weighting criteria, as will be discussed in further detail below, and the article is used to generate a game-specific narrative of the game, as indicated by process step 152.

Further detail regarding the various steps outlined above will be provided in the following paragraphs, with reference to an exemplary game template and desired game. Assume an end-user desires a report about a recently played basketball game played between the Panthers and the Vikings. The score was close for most of the game, but the winning team pulled away decisively in the fourth quarter to prevail 100 to 80. An article that merely identified the teams and provided the final score would be accurate, but it would not give a complete description of the game and would likely not be satisfactory to the end-user. However, as described herein, a template that generically (but entertainingly) described just such a game can easily be modified to provide an accurate description that appears to the end-user to have been generated just for the game under consideration.

Figure 5:
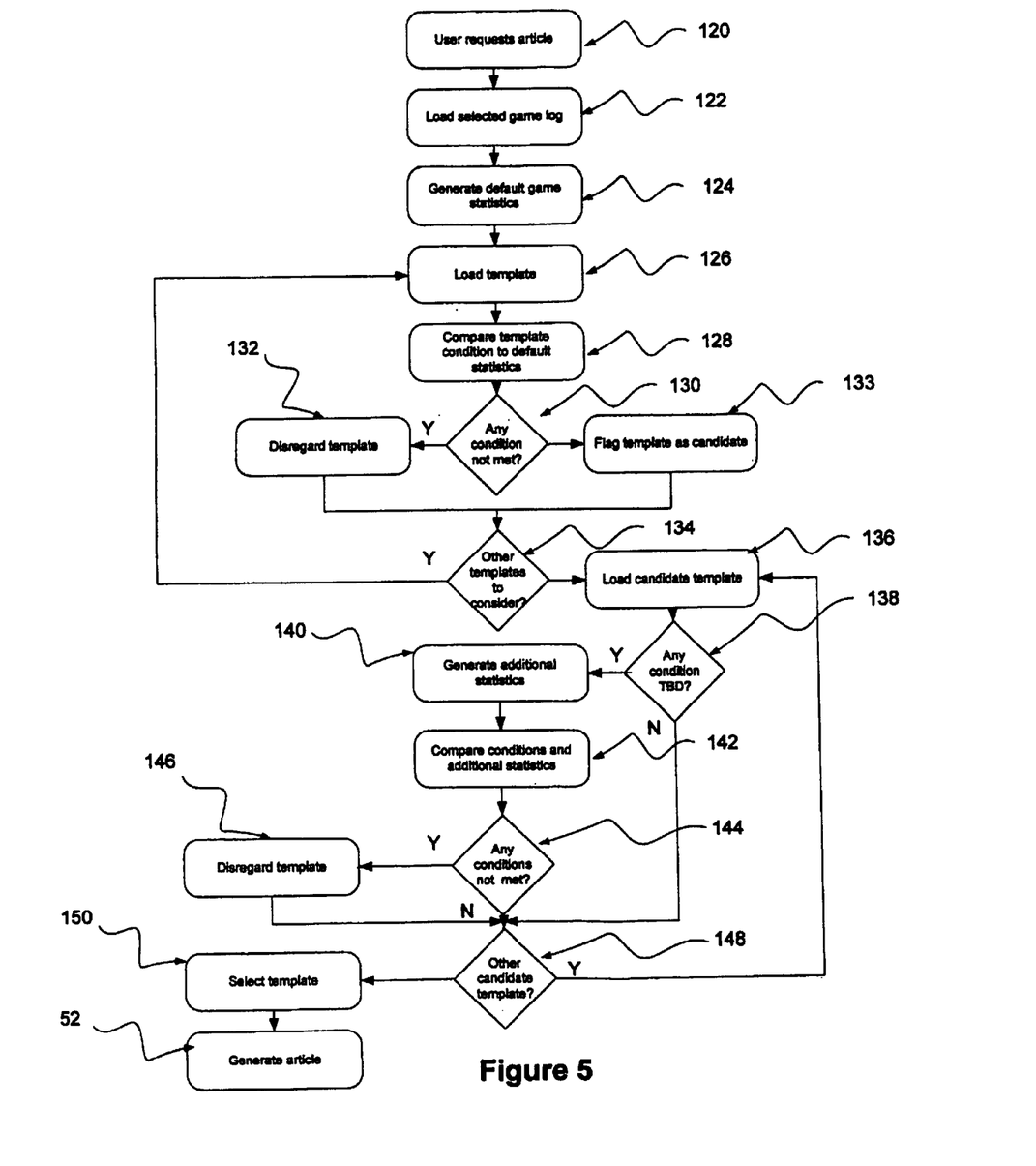
FIG. 5 is a flowchart of a preferred embodiment process for generating a narrative description of an event.

With reference to FIG. 5, once the end-user has identified the desired game (step 120) and the game log has been retrieved from database 58 (step 122), certain generic statistics, such as identifying the winning team and the losing team and the final score are generated by statistics generator 76 in step 124. Many templates can be compared to this set of basic statistics and eliminated in the first pass. For instance, templates that describe a tie game can be quickly eliminated. Such a template will have associated with it a condition defined by tokens such as [SwTeamPoints(Team1)]=[SwTeamPoints(Team2)]. The appropriate values generated in statistics generator 76 (i.e. TeamPoints(Team1)=100 and TeamPoints(Team2)=80) are then compared to the condition in step 128, resulting in a "no" indication that this condition is not met (i.e. 100 does not equal 80). Hence this template would be disregarded for further consideration, step 132. Likewise, any templates that describe a game in which the final score was very close would be eliminated. For instance, such a template might have the condition [SwScoreDiff]<10, which indicates that the final score difference must be less than ten. Obviously, the game under consideration has a final score difference of twenty points, and hence the template would be eliminated. On the other hand, one or more templates having the condition [SwScoreDiff]>15 would survive the first pass comparison of steps 124 through 134 and would be further evaluated in steps 136 through 150. Prior to discussing steps 136 through 150, however, additional details regarding an exemplary template 68 will be provided.

Consider the following text field 114 from an exemplary template 68 describing such a game as is described above:

[SwCity]—The [SwTeamName(WinTeam)] erupted in the fourth quarter for [SwTeamPoints(WinTeam,Q4)] points as the [SwTeamNickname(WinTeam)] ended up winning big over the [SwTeamName(LoseTeam)] [SwScore].

[SwMostPointsforPeriodName(WinTeam,Q4)] led the $4^{th}$ quarter offensive explosion with [SwMostPointsforPeriod(WinTeam,Q4)] points as a close contest turned ugly thanks to [SwTeamNickname(WinTeam)] shooting.

[SwPlayerName(WinTeam,Best)] led all scorers with [SwPlayerPoints(WinTeam,Best)] points, [SwPlayerPoints(WinTeam,Best,Q4)] of those coming in the final period to put the game away.

[SwplayerName(LoseTeam,Best)] had [SwPlayerPoints(LoseTeam,Best)] to keep his team close in the losing effort.

Obviously, much more information than simply the winning team, the losing team, and the final score must be determined in order to ascertain whether the above description matches the game. The conditions required for this template are as follows. Condition 1: the winning team must score double the losing team's points in the $4^{th}$ quarter, expressed using tokens as [SwTeamPoints(LoseTeam,Q4)] *2<=[SwTeamPoints(WinTeam,Q4)]. Condition 2: the lead scorer on the winning team must not have the highest point total for the team in the fourth quarter, expressed as

[SwPlayerPoints(WinTeam,Best,Q4)]!=[SwMostPointsForPeriod(WinTeam,Best)]. Condition 3: the winning team wins by fifteen points or greater, expressed as [SwScoreDiff]>15. Condition 4: one winning team player must score more than 10 points in the final quarter, expressed as [SwMostPointsForPeriod(WinTeam,Q4)]>10. Condition 5: the overall lead scorer must play on the winning team, expressed as [SwPlayerPoints(WinTeam, Best)]==[SwPlayerPoints(EitherTeam,Best)]. Note that a token can call for a text string (e.g. a team name such as [SwTeamName(WinTeam)]), can call for a statistic (e.g. the final score difference such as [SwScoreDiff]), and can also call out for one of the above values with limiting arguments (e.g. the highest points scored in a given period by a player on a given team, such as [SwPlayerPoints(WinTeam,Best,Q4)]). The use of tokens allows for great flexibility in writing a single template that can be readily adapted to incorporate as much detail about the actual game as possible.

Note also that some of the conditions for the exemplary template are quite specific (e.g. that one player on the winning team must score more than ten points in the final quarter). Such specificity in the conditions allows for templates that provide a great deal of game detail and provide the illusion that the article was written specifically for the game itself. On the other hand, it would be wasteful for statistics generator 76 to generate every possible statistic that every available template might rely upon each time an article is generated. This would require excessive processing power and would cause delay in system response. By generating only a narrow set of default or generic statistics for a first pass review, system response time can be greatly improved. Once a sub-set of candidate templates is identified (via steps 124 through 134 of FIG. 5), then the additional detailed statistics required for a second pass evaluation can be generated only for those statistics needed for the remaining templates. This second pass evaluation will now be described with reference to steps 136 through 148 of FIG. 5.

At step 136, the above described exemplary template would likely have a "yes" indication for Condition 3, i.e. that the final score difference was fifteen points or greater—as this statistic is one of the default statistics generated in step 124. The remaining conditions, however, require information not necessarily generated in step 124. Hence, these conditions will have TBD indications (recall that only a template with a "no" indication, meaning that sufficient information was available to determine the template did not match the game, are eliminated in step 132). Conditions 1, 2, 4, and 5 will be evaluated in steps 138 through 144, whereby, for each candidate template identified in step(s) 133, the tokens associated with the template's conditions will be passed to statistics generator 76, the required statistics will be calculated, and the results compared to the conditional criteria. If any of the TBD conditions result in a "no" indication, then the template will be disregarded, as shown in step 146. For purposes of illustration, however, we assume that all five conditions of the exemplary template match the game events. Further, we assume, as will likely be the case, that several other templates have survived both the first pass and second pass comparison. Therefore, several templates remain as possible candidates, any one of which will accurately describe the specific game. In the following paragraphs preferred embodiments for selecting one from among the several possible candidate templates will be discussed.

In step 150 of FIG. 5, a single template is selected from amongst several candidate templates for which all the conditions are satisfied by the game information and game statistics. In one preferred embodiment, each template is given a weighting factor corresponding to the number of conditions associated with it (recall that at this point, all the conditions must be satisfied in order for the template to still be under consideration). As described above, the more conditions associated with a template, the more detail the template provides about the game. Therefor, a template that has many satisfied conditions would be preferable to a template that has just a few satisfied conditions. Each template would describe the game accurately, but the template with the most conditions will describe the game in the most detail, and hence in the most satisfactory manner. Hence, the candidate template having the most conditions will be selected for generating a final article.

In an alternative embodiment, rather than simply adding up the number of conditions for each template, each condition could be given a weighting value. Some conditions might correspond to relatively unique game events or circumstances that are particularly newsworthy, even if other templates have more conditions. Take for instance, a template that has only three conditions—but one of those conditions is that the winning team just broke the league record for consecutive wins or entered into the play-offs because of the win (note that this condition requires reference to historical context, such as is provided by game summaries). This fact is particularly newsworthy and an article generated from that template would likely be more desirable to the end-user than an article generated from a template having five or so conditions, but which fails to mention the truly significant fact about the game. By the use of a weighting value associated with each condition, a template having a fewer number of highly relevant conditions will be selected over a template having a greater number of less newsworthy conditions.

Other weighting criteria could be applied to selection process 150 as well. For instance, web interface 12 preferably provides a mechanism whereby an end-user can offer feedback concerning whether an article was helpful, entertaining, informative and the like. Such feedback can easily be converted to a numeric ranking and template selector 72 can maintain a running tally of each template's "score" as indicated by the end-users. This feed back score can be used to select from among one or more templates having the same number of conditions, or can be used as an additional weighting factor when choosing from amongst several candidate templates. In yet another embodiment, an additional weighting factor relating to how recently each template was used to generate an article is employed. In order to ensure that the same template is not selected each time an end-user requests a game article, a last used weighting factor is employed to more heavily weight (i.e. favor) those candidate templates which have been least recently used. This will essentially allow the system to cycle through several of the same candidate templates that frequently match similar type games. In yet another embodiment, web interface 12 might provide the end-user the option to override the default selection and weighting factors, and interpose his or her own criteria and weighting factors to the selection process. As one specific example, the end-user may be presented with the option of specifying that a candidate template written by a particular author (i.e. having an specific by-line) be selected over all others.

The above description has illustrated how a template is selected for report generation in response to an end-user selecting a game for which he or she desires a report or article. The selection is based on eliminating reports having conditions that do not match with the game statistics and selecting from amongst the matching reports that report that has the most or the most relevant conditions. The preferred embodiments allow for a rapid selection of the best template without needlessly consuming processing cycles or generating unnecessary statistics for templates that will ultimately not be used. A further refinement in the template evaluation and selection process is now described with reference to FIG. 2 and scorekeeper rater 74.

As described above, an advantageous feature of the preferred embodiments is the ability to quickly and efficiently eliminate templates that will not match the game to be described. The first pass comparison discussed with reference to steps 124 through 134 of FIG. 5 supports this feature. Further support is provided by recognizing that the quality and quantity of the game events data (i.e. the game log 66) from which game statistics are to be generated is dependent upon the proficiency of the scorekeeper 3 (FIG. 1). As discussed in greater detail in co-pending patent application Ser. No. 09/455,551, the scorekeeper 3 inputs each game event as it occurs in real time and the game events are subsequently uploaded to database 58 as game log 66 for that game. Recognize that most scorekeepers will be able to track and record basic game events such as scoring events, but that less experienced and proficient scorekeepers might not be able to track and record other game events such as assists, missed shots, and the like. In a preferred embodiment, scorekeeper rater 74 is used to assign a proficiency rating for each scorekeeper 3 who enters game events into the system 10. This proficiency rating can be based upon several approaches. The simplest approach would be to provide an increased proficiency rating as the scorekeeper becomes more experienced (i.e. provides additional game logs). A preferable approach is a feedback mechanism based upon the number and quality of game events that are recorded for the games recorded by the scorekeeper. Alternatively, scorekeeper rater 74 could perform a simple pattern recognition algorithm in which the complexity of the templates selected is matched to the scorekeeper. A scorekeeper whose game logs are consistently matched with only the simplest template with a few conditions would have a low proficiency rating, whereas a scorekeeper whose game logs consistently match with templates that have a great number of conditions (indicating the game log provides good, detailed information) would have a higher proficiency rating.

Once a game log is selected as described above, scorekeeper rater 74 will read the identity of the scorekeeper who recorded the game log and will forward to template selector 72 a proficiency rating associated with that scorekeeper. Depending upon the proficiency rating, template selector 72 might eliminate several templates from consideration, prior to condition comparison step 128. For instance, each template 68 might have associated with it (either as a condition, or as a separate field) a proficiency rating requirement. Assuming the scorekeeper who recorded the game under consideration has a proficiency rating of "B." Template selector 72 need only load and evaluate those templates that have associated with them a proficiency rating requirement of "B" or lesser. Other, more complex templates with a proficiency rating requirement of "A" need not be considered because historically, such templates require much greater detail than a "B" rated scorekeeper provides. In yet another refinement to the approach, scorekeeper rater 74 will receive feedback from template selector 72 indicating the proficiency rating of the selected template. When a given scorekeeper consistently has "B" rated templates selected, template selector may upgrade the scorekeeper's rating to "A" for the next few articles. This means that more articles must be evaluated each time, but also means that a more informative and detailed s article will be selected if the scorekeeper's proficiency has progressed to the point where sufficient information is being entered in the game log. If after increasing the scorekeeper's proficiency rating to "A," template selector 72 still consistently selects "B" rated templates for that scorekeeper, than scorekeeper rater 74 will eventually downgrade the scorekeeper's efficiency rating back to "B." In this way, a balance is struck between the desire to provide the most detailed and hence entertaining templates to the end-user with the need to minimize response time and processor bandwidth in selecting the template.

Returning attention once more to FIG. 5, once an template is selected, a final article for presentation to the end-user is generated, step 152. The article is generated from the title field 110, the by-line field 112, and the text field 114 (FIG. 4). Each of these fields will be reviewed, in turn to determine whether any tokens are contained therein requiring insertion of a text string. When a token is encountered, the token will call out the appropriate routine or function, complete with any arguments associated with the function, to statistics generator 76, which returns the requested information. Preferably, the information is returned in the form of a text string, even though the string might represent a numerical value such as final score, a point value, or the like. The strings are inserted into the appropriate locations and the tokens are removed from the text, leaving a complete article in which game-specific information is inserted seamlessly. Taking the example provided above, information stored in game log 66 or generated by statistics generator 76 will be inserted in place of the tokens, resulting in an article as follows:

PANTHERS PULL AWAY IN FOURTH QUARTER TO TROUNCE Blue Devils by Dave Schmid

Plano—The Plano Panthers Basketball Team erupted in the fourth quarter for 30 points as the Panthers ended up winning big over the Central High Blue Devils Basketball Team 100 to 80.

Ron Toupal led the $4^{th}$ quarter offensive explosion with 12 points as a close contest turned ugly thanks to Panther shooting.

David Schmid led all scorers with 16 points, 8 of those coming in the final period to put the game away.

As illustrated, the final article provides detailed information about the game, the teams, even individual players in an informative and entertaining manner. This example illustrates the flexibility of the system and the manner in which a generic template can incorporate game specific references to make the article appear to have been written with the specific game in mind. Once generated, the article can be presented to the end-user in any well known or desired format, including as a plain or enriched text format, in a popular word processor format, such as Microsoft Word™ or WordPerfect™, or in HTML or other common worldwide-web compatible format. Also contemplated is the inclusion of hyper-links within the body of the finished article.

These hyperlinks can provide quick access to other portions of the article itself, to information contained within other articles or references, or to other pages and sites within or without web interface 12. Hyperlinks can be provided using hyper-text transfer protocol (HTTP) or other well known protocols. In some embodiments, some game events may be recorded using an event recorder 11 with audio or video capturing capabilities. These game events can also be included in the finished article with appropriate hyper-links. For instance, videos of key plays of the game can be stored in game log 66 and can be incorporated into finished article as a hyperlink or icon. The end-user can selected the hyper-link or icon in order to view the video. Likewise with other game, team, or player related media such as audio captures from the game, player statistics, team home pages, and the like.

Once generated, a finished article may be stored in database 58 or in some other adapted mass storage device or medium. Alternatively, and by taking advantage of the present invention which allows for rapid and efficient generation of game articles, the finished article need not be stored at all, but can be sent to the requesting end-user and then discarded. In such an instance, when another end-user requests an article or report on the same game, the above described automatic report generation processes would need to be employed yet again. Essentially, whether or not to store the finished articles is a design choice based upon balancing the system load arising from multiple requests for the same game versus storage capacity and retrieval needs and requirements. Preferably, the system provides sufficient flexibility to allow for certain articles to be stored, perhaps on a first-in-first-out basis (i.e. as more recently generated articles and stored, less recently used articles are deleted from the storage device or medium). Alternatively, certain games likely to generate a high number of requests, such as league play-off games and the like, could be stored to a storage medium and quickly retrieved when requested, whereas less popular games could be generated "on the fly" when requested.

The templates described above contain an entire article in each template. In other embodiments, the articles may be broken down into a series of templates to allow for more variety and detail in the resulting end-product. For instance, each article can be described as an outline of generic paragraphs—e.g. an introductory paragraph, a final score paragraph, a top scorer paragraph, a season standings paragraph, and the like. Each paragraph can be thought of as a miniature template, as described above, with its own set of conditions and text fields, and tokens. Once an article format or outline is selected, the above described selection process can be performed for each type of is paragraph to select a best fit paragraph for the game being described. The selection process can be further simplified by recognizing that certain paragraphs templates will naturally fit together and hence, once a certain introductory paragraph is selected, many other possible paragraphs can be quickly eliminated as being inconsistent with the content, or even the tone, of the introductory paragraph. For this reason, the order in which the paragraph templates are selected is preferably configured to minimize the likelihood that inconsistent paragraphs are selected for an article. For instance, an article containing a paragraph describing a serious injury to a player would preferably not have a light-hearted introductory paragraph. As such, recognizing the selection of the injured player paragraph first would eliminate many introductory paragraphs and hence simplify the selection process.

A brief description of the template creation process is now provided. In the preferred embodiments, the article templates are written by an author (preferably a professional sports writer or article writer or other person well-versed in the game or type of event to be described). It is desirable to make the template generation process as unobtrusive as possible so as to allow the author to focus his or her attention on the creative aspects of the article, rather than on the mechanical aspects of generating a template. Preferably, the author types an article in his or her normal manner, without concern as to inserting tokens, generating conditions or the like. More preferably, the article is written using Word™ or WordPerfect™ or a similar computer word processing system. The author may wish to write an article describing an actual game, or may wish to write an article describing a specific "type" of game and using fictitious names for the team, players, and the like. Once the article is written, tokens can be substituted for the variable information such as team and player names, final scores, game date and location, and the like. This substitution is preferably accomplished automatically using a macro that is compatible with the software with which the article was written. The author highlights a word or phrase in the article, such as a team name, and the macro will insert the appropriate token (e.g., SwTeam). In the preferred embodiment, the author selects the appropriate token from a list or menu provided by the macro, although other embodiments are contemplated in which the macro has sufficient "intelligence" to suggest a macro based upon the highlighted word or phrase. After the tokens have been substituted into the text of the article template, condition fields can then be generated, either by the author himself, or through an automated process that generates the conditions based upon the information that was contained in the originally authored article. As an example, as authored, the article may have described a game in which the final score differential was greater than fifteen points. Based upon this information, an automated process could be provided to generate a condition that the final score differential be greater than, say, twelve points, in order for the template to apply. This process needs access to the originally authored article, of course, because once the template is generated, the actual game scores will have been removed and will have been substituted with appropriate tokens. Other variations on the template creation process will be apparent to one skilled in the art through routine experimentation.

In the preferred embodiments, the various routines and processes described are preferably object oriented software programs running on general purpose computers. Preferably, the computers are linked together over the Internet using TCP/IP, FTP, MAL and other well-known communication protocols. Alternatively, the inventive concepts could be embodied in special purpose, dedicated computers, or by utilizing a propriety data network. The embodiments have been described with reference to amateur sports organizations, although the applicability of the invention to professional sports is also contemplated. Additionally, the inventive concepts could be applied to other embodiments. Such a system would be particularly appealing to, e.g. a private school which desires to efficiently and inexpensively provide reports about its and its students performance to, e.g. university, potential employers, and the like. Other embodiment automatic report generator systems might provide for collection, organization, management and dissemination of information about, e.g., gaming activities of any sort, internet gaming activities, contests, market reports, corporate events, medical procedures, political races, and the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

We claim:

1. A system for automatically generating a report about a happening comprising:
   a database comprised of logs, each log corresponding to a specific happening and being comprised of a plurality of events;
   a statistics generator routine running on a general purpose computer receiving as input the plurality of events for a specific happening and outputting statistics regarding the specific happening;
   a template database comprised of article templates, each article template having one or more conditions associated with it;
   a template selector comprising
      a comparison routine running on a general purpose computer receiving as input the one or more conditions associated with a first template under consideration and further receiving as input statistics regarding the specific happening, and outputting an indication whether the conditions associated with the first template are met by the statistics; and
      a selector routine running on a general purpose computer, wherein the selector routine applies a weighting evaluation to each template having conditions met by the statistics and outputs a single selected template; and
      an article creator routine receiving as input the selected template, wherein the selected template comprises a body of text containing function calls and wherein the functions call out for specific statistics, the article creator routine outputting a report comprising the body of the text with the specific statistics inserted in place of the function calls.

2. The system of claim 1 wherein the statistics comprise numerical calculations selected from the group consisting of final score and score differential, and non-numerical values selected from the group consisting of team and player names, and time stamp values.

3. The system of claim 1 wherein the selector routine selects the template in response to the number of conditions associated with it.

4. The system of claim 1 wherein the selector routine selects the template in response to the weighting evaluation applied to each template.

5. The system of claim 1 wherein the log database and the template database comprise a single database.

6. The system of claim 1 wherein the routines are realized in a general purpose computer operating in response to pre-programmed instructions.

7. A system for automatically generating a report about a happening comprising:
   a database comprised of logs, each log corresponding to a specific happening and including a plurality of events;
   a statistics generator coupled to the database, receiving as input the plurality of events for a specific happening and outputting statistics regarding the specific happening;
   a template database comprised of article templates, each article template being a pre-written description of a model happening in which references to an actual happening can be input and having one or more conditions associated with it;
   a template selector process comprising
      a comparison routine receiving as input the one or more conditions associated with a first template under consideration and further receiving as input statistics regarding the specific happening, and outputting an indication whether the conditions associated with the first template are met by the statistics; and
      a selector routine, wherein the selector routine applies a weighting evaluation to each template having conditions met by the statistics and outputs a single selected template; and
      an article creator routine receiving as input the selected template, wherein the selected template comprises a body of text containing function calls and wherein the functions calls call out for specific statistics, the article creator routine outputting a report comprising the body of the text with the specific statistics inserted in place of the function calls.

8. A computer-based method of generating a text-based description of a particular game of a sport, comprising:
   providing a plurality of article templates, each such article template being a text-based, narrative description of a generic game of said sport;
   defining at least one conditional requirement for each of said plurality of article templates;
   recording a plurality of events from said game, including a final score of said game;
   generating pre-selected statistics from the recorded events, said pre-selected statistics including a final score differential;
   comparing a first conditional requirement for a first article template to said final score differential;
   determining if said first conditional requirement is satisfied by said final score differential and if so selecting said first article template for publication and inserting at least one of said recorded events into an appropriate location in said article template to generate a game-specific, text-based, narrative description of said game.

9. The method of claim 8 wherein said first conditional requirement is satisfied if said final score differential exceeds a pre-defined limit.

10. The method of claim 8 wherein said plurality of article templates is specific to a first sport and further comprising providing a second plurality of article templates specific to a second sport.

11. The method of claim 8 wherein said at least one conditional requirement has a weighting factor associated with it.

12. The method of claim 8 wherein said article template is a word processing document having fields contained therein for insertion of one or more of said events from said game.

* * * * *